US011340572B1

(12) United States Patent
Lambert et al.

(10) Patent No.: US 11,340,572 B1
(45) Date of Patent: May 24, 2022

(54) COMMUNICATION WITH AN INFORMATION HANDLING SYSTEM AIR MOVER USING ENHANCED DATA-OVER-TACHOMETER SIGNAL PROTOCOL WITH VARIABLE READ AND WRITE COMMANDS

(71) Applicant: Dell Products L.P., Round Rock, TX (US)

(72) Inventors: Timothy M. Lambert, Austin, TX (US); Michael J. Stumpf, Cedar Park, TX (US); Nihit S. Bhavsar, Round Rock, TX (US); Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 17/100,510

(22) Filed: Nov. 20, 2020

(51) Int. Cl.
| | |
|---|---|
| *G08B 1/08* | (2006.01) |
| *G05B 19/042* | (2006.01) |
| *F24F 11/30* | (2018.01) |
| *F24F 11/58* | (2018.01) |
| *F24F 11/72* | (2018.01) |
| *F24F 11/65* | (2018.01) |
| *H04L 12/28* | (2006.01) |
| *G08B 25/06* | (2006.01) |
| *H04L 67/12* | (2022.01) |

(52) U.S. Cl.
CPC ............ *G05B 19/042* (2013.01); *F24F 11/30* (2018.01); *F24F 11/58* (2018.01); *F24F 11/65* (2018.01); *F24F 11/72* (2018.01); *G08B 25/06* (2013.01); *H04L 12/2803* (2013.01); *G05B 2219/2614* (2013.01); *H04B 2203/5404* (2013.01); *H04L 67/12* (2013.01)

(58) Field of Classification Search
CPC ... G05B 19/042; G05B 2219/26; F24F 11/65; F24F 11/72; F24F 11/30; F24F 11/58; G08B 25/06; H04L 12/2803; H04L 67/12; H04B 2203/5404
USPC ......................................................... 340/538
See application file for complete search history.

(56) References Cited

U.S. PATENT DOCUMENTS

| | | | |
|---|---|---|---|
| 3,761,637 A * | 9/1973 | Henrion ................. | H04Q 11/04 370/359 |
| 10,215,436 B1 * | 2/2019 | Rawski .................... | F24F 11/86 |
| 10,352,956 B2 * | 7/2019 | Bowers, III ............ | G01P 3/481 |

(Continued)

*Primary Examiner* — Zhen Y Wu
(74) *Attorney, Agent, or Firm* — Jackson Walker L.L.P.

(57) ABSTRACT

An information handling system may include an air mover configured to drive a flow of air and a processing component communicatively coupled to the air mover for controlling operation of the air mover via a first wire configured to communicate analog air mover speed commands from the processing component to the air mover for controlling a speed of the air mover and a second wire configured to communicate analog tachometer information from the air mover to the processing component. At least one of the air mover and the processing component may be configured to initiate a mode for serial digital communication via the first wire and the second wire. The air mover and the processing component may be configured to communicate information to each other in accordance with a digital communication protocol via the first wire and the second wire during the mode for serial digital communication.

24 Claims, 2 Drawing Sheets

(56) References Cited

U.S. PATENT DOCUMENTS

| | | | | |
|---|---|---|---|---|
| 2001/0039190 A1* | 11/2001 | Bhatnagar | ............... | G05D 27/02 |
| | | | | 455/450 |
| 2005/0040247 A1* | 2/2005 | Pouchak | ................. | F24F 11/30 |
| | | | | 236/44 C |
| 2005/0278071 A1* | 12/2005 | Durham, III | ....... | G05D 23/1932 |
| | | | | 700/276 |
| 2007/0185673 A1* | 8/2007 | Hubanks | ............... | G01D 18/008 |
| | | | | 702/85 |
| 2015/0338314 A1* | 11/2015 | Meyer | ................. | G01M 99/005 |
| | | | | 73/40 |
| 2017/0343231 A1* | 11/2017 | Rumler | .................... | F24F 11/30 |
| 2018/0310670 A1* | 11/2018 | Rovekamp, Jr. | ........ | G05B 15/02 |
| 2019/0154267 A1* | 5/2019 | Garces | .................... | F24C 3/124 |
| 2020/0064791 A1* | 2/2020 | Galvez | .................... | G10L 25/51 |
| 2020/0064796 A1* | 2/2020 | Galvez | ................ | H04L 12/2807 |
| 2020/0284459 A1* | 9/2020 | Gupta | ...................... | F24F 11/50 |
| 2021/0033301 A1* | 2/2021 | Boody | .................... | F24F 3/044 |

* cited by examiner

FIG. 1

COMMUNICATION WITH AN INFORMATION HANDLING SYSTEM AIR MOVER USING ENHANCED DATA-OVER-TACHOMETER SIGNAL PROTOCOL WITH VARIABLE READ AND WRITE COMMANDS

TECHNICAL FIELD

The present invention relates in general to the field of information handling system cooling fan operations, and more particularly to a system and method for communication with an information handling system cooling fan using a communication upgrade module.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

With the growing importance of information handling systems to businesses and individuals, reliability has become an increasingly important factor in system design and selection. A growing number of components include monitoring subsystems that monitor for and report abnormal operations so that the risk of overall system failure and down time is decreased. If a failure of a component is detected or anticipated, the component is typically replaced as soon as practicable to avoid unnecessary downtime. Often, relatively inexpensive and non-complex components prove critical to the operation of an information handling system. For example, if one or more air movers of an information handling system fails, the system will quickly overheat, leading to automated shutdown by safety systems that detect the overheating or, worse, leading to catastrophic failure of one or more components.

Information handling system air movers typically run at variable speeds to provide variable amounts of cooling airflow. Running an air mover at a reduced speed helps reduce acoustic noise and power consumption where higher speeds are not needed to cool information handling system components. Typically, a feedback system is used to control air mover speed so that speed increases with operating temperature increases and decreases with operating temperature decreases. One type of air mover feedback system works with a three-wire configuration: a power wire, a ground wire and a tachometer wire. The tachometer wire provides air mover speed measurements to a thermal control system of the information handling system. The thermal control system may adjust the air mover speed in response to changes in operating temperature by adjusting the power applied to the power wire. Another type of air mover feedback system works with a four-wire configuration: a power wire, a ground wire, a tachometer wire, and a pulse width modulation (PWM) wire. Instead of controlling air mover speed by varying the application of power, in four-wire air movers air mover speed commands are sent through the PWM wire so that a microcontroller on the air mover adjusts air mover speed with a constant voltage supply.

In many instances, it may be desirable to enable two-way communication with an air mover beyond the communication of PWM and tachometer signals. For example, it may be desirable to enable communication that allows for retrieval of information from the air mover besides tachometer signals, such as data stored in a field-replaceable unit of the air mover, dynamic data associated with the air mover (e.g., odometer, uptime, current consumption), logs or other diagnostic data. As another example, it may be desirable to enable communication of information to the air mover other than PWM signals, such as special commands or programming (e.g., firmware updates to the air mover).

While some solutions exist integrating such advanced communication techniques into air movers, such solutions have disadvantages. For example, introducing communication functionality into an air mover may lead to design complexity as additional communication wires may be needed and existing electrical architectures of air movers and cables coupling air movers to thermal control systems may require modification.

SUMMARY

In accordance with the teachings of the present disclosure, the disadvantages and problems associated with traditional approaches to communication with an air mover may be substantially reduced or eliminated.

In accordance with embodiments of the present disclosure, an information handling system may include an air mover configured to drive a flow of air and a processing component communicatively coupled to the air mover for controlling operation of the air mover via a first wire configured to communicate analog air mover speed commands from the processing component to the air mover for controlling a speed of the air mover and a second wire configured to communicate analog tachometer information from the air mover to the processing component. At least one of the air mover and the processing component may be configured to initiate a mode for serial digital communication via the first wire and the second wire. The air mover and the processing component may be configured to communicate information to each other in accordance with a digital communication protocol via the first wire and the second wire during the mode for serial digital communication.

In accordance with these and other embodiments of the present disclosure, a method may include, in an information handling system including an air mover configured to drive a flow of air and a processing component communicatively coupled to the air mover for controlling operation of the air mover via a first wire configured to communicate analog air mover speed commands from the processing component to the air mover for controlling a speed of the air mover and via a second wire configured to communicate analog tachometer information from the air mover to the processing component: initiating, by one of the air mover and the processing component, a mode for serial digital communication via the first wire and the second wire; and responsive to initiating the mode for serial digital communication, communicating, by the air mover and the processing component, information to each other in accordance with a digital communication protocol via the first wire and the second wire during the mode for serial digital communication.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
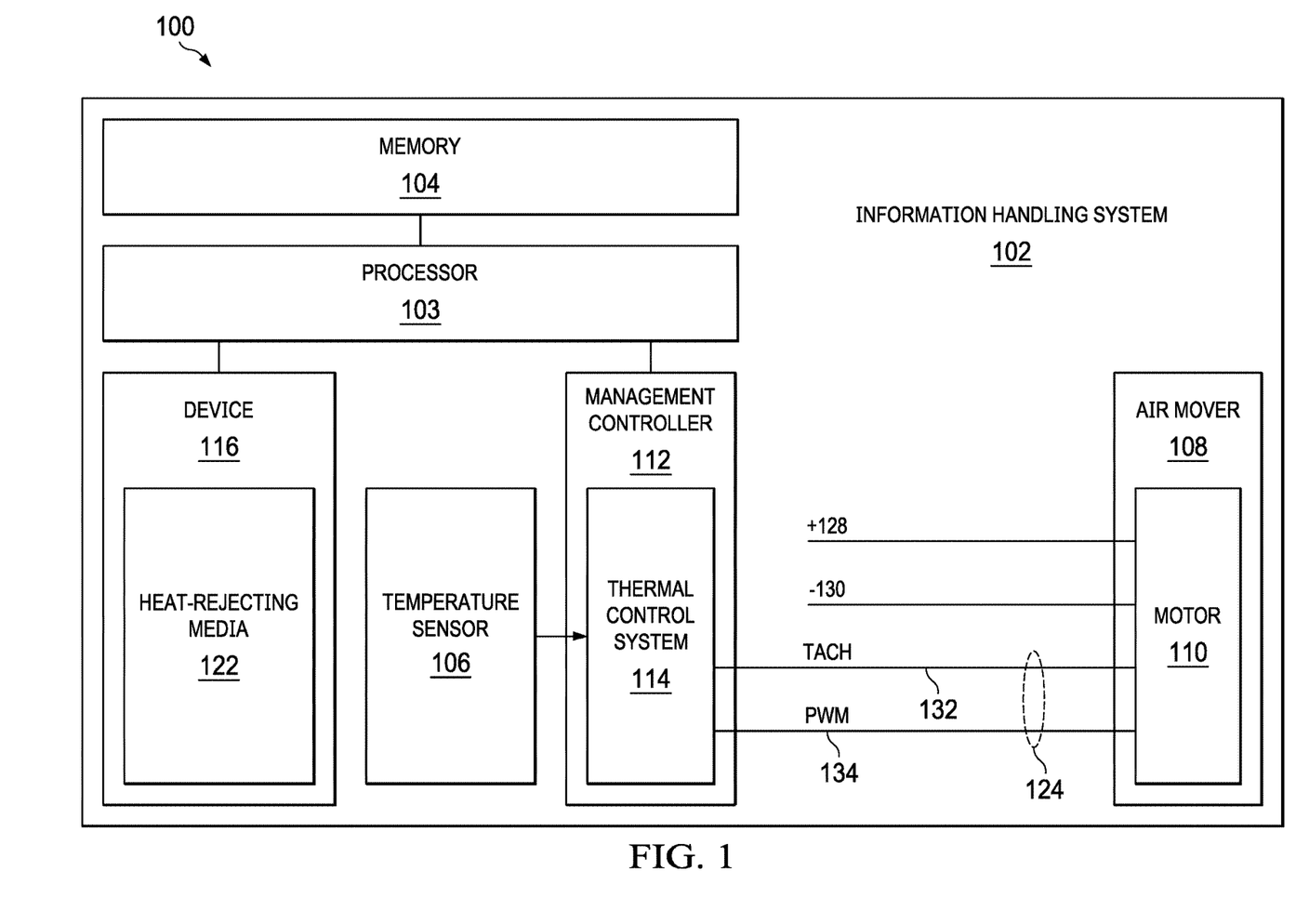
FIG. 1 illustrates a block diagram of an example information handling system, in accordance with embodiments of the present disclosure.
Figure 2A:
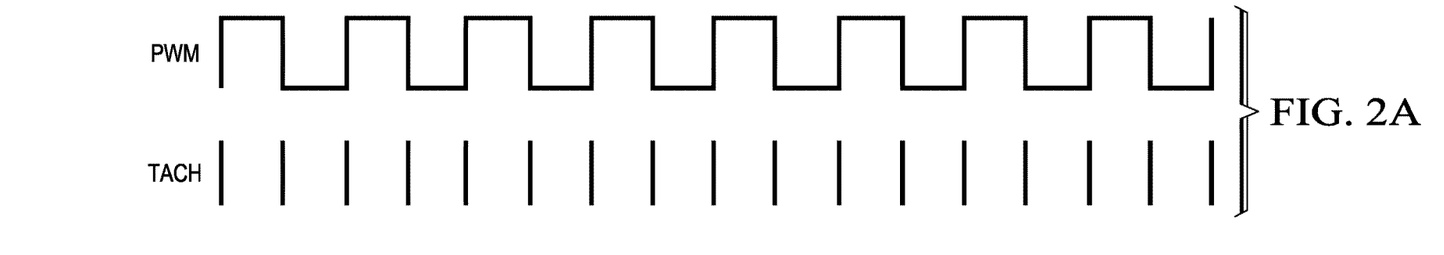
FIGS. 2A-2C illustrate a flow chart of an example method for establishing a communication link between a management controller and a communication module, in accordance with embodiments of the present disclosure.
Figure 2B:
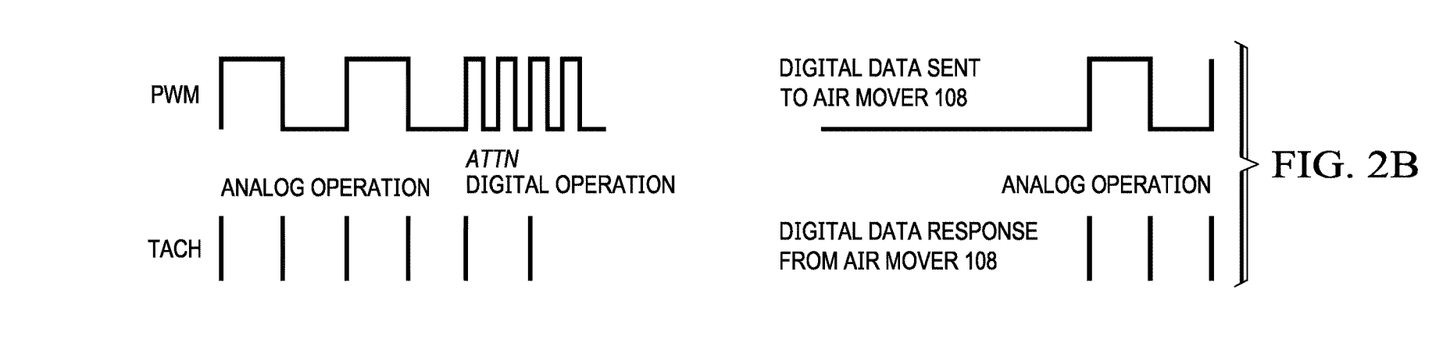
Figure 2C:
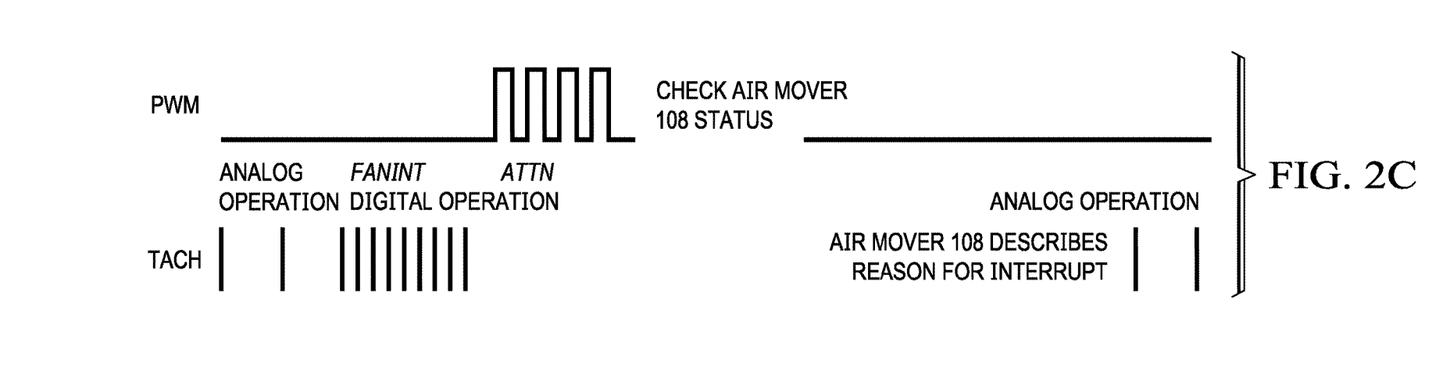

Preferred embodiments and their advantages are best understood by reference to FIGS. 1 through 2C, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may include a chassis 100 housing a processor 103, a memory 104, a temperature sensor 106, an air mover 108, a management controller 112, a cable 124 for communicatively coupling air mover 108 to management controller 112, a device 116, heat-rejecting media 122, and a power wire (+) 128 and ground wire (−) 130 from which air mover 108 may draw electrical energy for operation.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover 108 may include any mechanical or electro-mechanical system, apparatus, or device operable to move air and/or other gases in order to cool information handling resources of information handling system 102. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by an air mover control signal communicated from thermal control system 114 of management controller 112. In operation, air mover 108 may cool information handling resources of information handling system 102 by drawing cool air into an enclosure housing the information handling resources from outside the chassis, expelling warm air from inside the enclosure to the outside of such enclosure, and/or moving air across one or more heat sinks (not explicitly shown) internal to the enclosure to cool one or more information handling resources.

Management controller 112 may comprise any system, device, or apparatus configured to facilitate management and/or control of information handling system 102 and/or one or more of its component information handling resources. Management controller 112 may be configured to issue commands and/or other signals to manage and/or control information handling system 102 and/or its information handling resources. Management controller 112 may comprise a microprocessor, microcontroller, DSP, ASIC, field programmable gate array ("FPGA"), EEPROM, or any combination thereof. Management controller 112 may also be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

As shown in FIG. 1, management controller 112 may include a thermal control system 114. Thermal control system 114 may include any system, device, or apparatus configured to receive one or more signals indicative of one or more temperatures within information handling system 102 (e.g., one or more signals from one or more temperature sensors 106), and based on such signals, calculate an air mover driving signal to maintain an appropriate level of cooling, increase cooling, or decrease cooling, as appropriate, and communicate such air mover driving signal to air mover 108 (e.g., a pulse-width modulation signal on PWM wire 134 of cable 124). In these and other embodiments, thermal control system 114 may be configured to receive information from other information handling resources and calculate the air mover driving signal based on such received information in addition to temperature information. For example, as described in greater detail below, thermal control system 114 may receive configuration data from device 116 and/or other information handling resources of information handling system 102, which may include thermal requirements of one or more information handling resources. In addition to temperature information collected from sensors within information handling system 102, thermal control system 114 may also calculate the air mover driving signal based on such information received from information handling resources.

Temperature sensor 106 may be any system, device, or apparatus (e.g., a thermometer, thermistor, etc.) configured to communicate a signal to management controller 112 or another controller indicative of a temperature within information handling system 102. In many embodiments, information handling system 102 may comprise a plurality of temperature sensors 106, wherein each temperature sensor 106 detects a temperature of a particular component and/or location within information handling system 102.

Device 116 may comprise any component information handling system of information handling system 102, including without limitation processors, buses, memories, I/O devices and/or interfaces, storage resources, network interfaces, motherboards, integrated circuit packages, electro-mechanical devices, displays, and power supplies.

As shown in FIG. 1, device 116 may have mechanically and thermally coupled thereto heat-rejecting media 122. Heat-rejecting media 122 may include any system, device, or apparatus configured to transfer heat from an information handling resource (e.g., device 116, as shown in FIG. 1), thus reducing a temperature of the information handling resource. For example, heat-rejecting media 122 may include a solid thermally coupled to the information handling resource (e.g., heatpipe, heat spreader, heatsink, fin-stack, etc.) such that heat generated by the information handling resource is transferred from the information handling resource into air surrounding the information handling resource. For example, in the embodiments represented by FIG. 1, heat-rejecting media 122 may be thermally coupled to device 116 and arranged such that heat generated by device 116 is transferred to air driven by air mover 108.

As mentioned above, a cable 124 may communicatively couple air mover 108 to thermal control system 114 and management controller 112. Cable 124 may comprise a plurality of electrically-conductive wires (which may be electrically insulated from one another) running generally parallel along the length of cable 124. Cable 124 may also include suitable terminations at each end of cable 124, for example a connector (not explicitly shown) for coupling to management controller 112 and a connector (not explicitly shown) for coupling to air mover 108.

As shown in FIG. 1, cable 124 may include tachometer (tach) wire 132 and PWM wire 134. Thus, in operation, power wire 128 and ground wire 130 may provide electrical energy to motor 110 to drive air flow from air mover 108. Thermal control system 114 may control a speed of air mover 108 via a driving signal (e.g., a serial pulse width modulated signal) communicated via PWM wire 134. A tachometer (not expressly shown in FIG. 1) of motor 110 (or a rotor of air mover 108) may generate a signal indicative of a speed of air mover 108, which may be communicated via tach wire 132 to thermal control system 114, thus providing feedback to thermal control system 114 to enable thermal control system 114 to determine an appropriate driving signal by considering the measured air mover speed received via tach wire 132.

In addition to processor 103, memory 104, temperature sensor 106, air mover 108, management controller 112, cable 124, device 116, and heat-rejecting media 122, information handling system 102 may include one or more other information handling resources. In addition, for the sake of clarity and exposition of the present disclosure, FIG. 1 depicts only one air mover 108 and one device 116. In embodiments of the present disclosure, information handling system 102 may include any number of air movers 108 and devices 116. However, in some embodiments, approaches similar or identical to those used to cool device 116 as described herein may be employed to provide cooling of processor 103, memory 104, management controller 112, and/or any other information handling resource of information handling system 102.

In operation, thermal control system 114 and air mover 108 may be configured to operate in a plurality of modes, as described in greater detail below. For example, in "normal" operation, thermal control system 114 and air mover 108 may operate in a legacy mode as shown in FIG. 2A. In the legacy mode, thermal control system 114 and air mover 108 may operate in a traditional manner in which thermal control system 114 communicates to air mover 108 an analog PWM signal over PWM wire 134 to set a speed of motor 110 as a function of a duty cycle of the PWM signal, and air mover 108 communicates to thermal control system 114 an analog tachometer signal over tachometer wire 132 indicative of a rotational speed of motor 110 (e.g., a pulse-frequency modulated signal wherein frequency of tachometer signal pulses is indicative of a number of revolutions per minute of motor 110).

As another example, thermal control system 114 and air mover 108 may be configured to operate in a first hybrid mode initiated by thermal control system 114 as depicted in FIG. 2B, which enables digital communication of data between thermal control system 114 and air mover 108 via PWM wire 134 and tachometer wire 132 while maintaining adequate control of speed of motor 110. As shown in FIG. 2B, thermal control system 114 and air mover 108 may begin operation in legacy mode, and thermal control system 114 may initiate the first hybrid mode by communicating an attention signal ATTN, which may be a PWM signal at a frequency significantly different than that used to communicate the analog PWM signal for controlling speed of motor 110. For example, in some embodiments, attention signal ATTN may be at a frequency four times greater than the analog PWM signal communicated by thermal control system 114. After communication of attention signal ATTN, thermal control system 114 may digitally communicate in serial fashion one or more commands or other data to air mover 108 via PWM wire 134.

As a particular example, digital data communicated from thermal control system 114 to air mover 108 during the first hybrid mode may take the form:
ATTN PWM CMD [ARG1 ARG2 ARG3 . . . ] CRC
wherein:
ATTN may be attention signal ATTN, which may be a PWM signal at a frequency significantly different than that used to communicate the analog PWM signal for controlling speed of motor 110;
PWM may be a digital representation (e.g., eight bits in length) of a desired analog PWM signal;
CMD may be a command (e.g., eight bits in length) to air mover 108, examples of which include:
No command (e.g., set PWM only);
Read status of air mover 108;
Read health of air mover 108;
Set a parameter of air mover 108;
Update firmware of air mover 108;
ARG1, ARG2, ARG3, etc. may include one or more arguments for the command represented by CMD, and such arguments may vary based on the command issued; and
CRC may be a cyclic redundancy check to detect packet corruption in the communication of the digital command.

In response to receiving attention signal ATTN, air mover 108 may temporarily cease generation of the analog tachometer signal, await receipt of commands or other data from thermal control system 114 via PWM wire 134, and then digitally communicate in serial fashion via tachometer wire 132 one or more responses to the commands and/or data received from thermal control system 114.

As a particular example, digital data communicated from air mover 108 to thermal control system 114 during the first hybrid mode may take the form:
RC ERRINT TACH [DATAn] CRC
wherein:
RC may comprise a return code (e.g., 00 indicating success, 01 indicating error);
ERRINT may be an error interrupt that if asserted, indicates that air mover 108 has detected a condition that should be checked by thermal control system 114;
TACH may be a digital representation (e.g., eight bits in length) of the analog tachometer signal;
DATAn may include data responsive to the command CMD communicated from thermal control system 114, and such commands may vary by command; and
CRC may be a cyclic redundancy check to detect packet corruption in the communication of the digital command.

After air mover 108 completes transmission if its response to thermal control system 114, thermal control system 114 and air mover 108 may return to operation in the legacy mode.

As a further example, thermal control system 114 and air mover 108 may be configured to operate in a second hybrid mode initiated by air mover 108 as depicted in FIG. 2C, which enables digital communication of data between thermal control system 114 and air mover 108 via PWM wire 134 and tachometer wire 132 while maintaining adequate control of speed of motor 110. As shown in FIG. 2C, thermal control system 114 and air mover 108 may begin operation in legacy mode, and air mover 108 may initiate the second hybrid mode by communicating a fan interrupt signal FANINT via tachometer wire 132, which may be a signal at a frequency significantly different than that used to communicate the analog tachometer signal indicative of the speed of motor 110. For example, in some embodiments fan interrupt signal FANINT may be at a frequency two or more times greater than a frequency which indicates a maximum speed of motor 110. After communication of fan interrupt signal FANINT, air mover 108 may pause communication of the analog tachometer signal.

Receipt of fan interrupt signal FANINT may serve as a trigger to thermal control system 114 that thermal control system 114 should issue a command to determine the health and/or status of air mover 108. Thus, in response to receipt of fan interrupt signal FANINT, thermal control system 114 may communicate an attention signal ATTN via PWM wire 134 (as described above) and communicate a command via PWM wire 134 (as described above) to check the status and/or health of air mover 108. In response, air mover 108 may communicate a response via tachometer wire 132 (as described above) indicative of the reasons for the generation of the interrupt by air mover 108.

After air mover 108 completes transmission if its response to thermal control system 114, thermal control system 114 and air mover 108 may return to operation in the legacy mode.

Accordingly, the systems and methods described above may enable an extensible command set communicated over a serial digital protocol to digitally communicate commands on PWM wire 134 and digitally read data from air mover 108 on tachometer wire 132. Such serial digital protocol may be initiated by either of thermal control system 114 or air mover 108.

The serial digital protocol may be a bidirectional protocol layered over an analog legacy protocol. Backward compatibility of the analog legacy protocol may be maintained, as a legacy thermal control system 114 may simply ignore fan interrupt signal FANINT and a legacy air mover 108 may simply ignore attention signal ATTN. The command set may be extensible and optimized for particular applications and use cases.

The systems and methods described above may also enable an out-of-band host interrupt (e.g., fan interrupt signal FANINT) generated by air mover 108 to allow for a command/response sequence initiated by air mover 108 without the need for an addition interface over the existing interface of tachometer wire 132 and PWM wire 134.

The systems and methods described above may further enable an air mover to be dynamically queried and updated, via commands from thermal control system 114 to set a mode, report status, update watchdog behavior, and/or update other functional behavior. The systems and methods described above may additionally enable retrieval of error logs, operational history, and observed environmental conditions of an air mover without the need of an additional interface. The systems and methods described above may further enable updates to firmware of air mover 108 without an additional interface.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    an air mover configured to drive a flow of air; and
    a processing component communicatively coupled to the air mover for controlling operation of the air mover via:
        a first wire configured to communicate analog air mover speed commands from the processing component to the air mover for controlling a speed of the air mover, wherein the analog air mover speed commands comprise an analog pulse-width modulated signal such that the speed of the air mover is set as a function of a duty cycle of the analog pulse-width modulated signal; and
        a second wire configured to communicate analog tachometer information from the air mover to the processing component; and
    wherein the processing component is configured to initiate a mode for serial digital communication by communicating a pulse-width modulated signal via the first wire at a frequency significantly different than a frequency of the analog pulse-width modulated signal; and
    wherein the air mover and the processing component are configured to communicate information to each other in accordance with a digital communication protocol via the first wire and the second wire during the mode for serial digital communication.

2. The information handling system of claim 1, wherein in response to the processing component initiating the mode for serial digital communication, the processing component communicates a command via the first wire to the air mover in accordance with the digital communication protocol.

3. The information handling system of claim 2, wherein, in response to receipt of the command, the air mover communicates a response via the second wire to the processing component in accordance with the digital communication protocol.

4. The information handling system of claim 1, wherein:
the air mover is configured to initiate the mode for serial digital communication by communicating an initiation signal via the second wire; and
in response to the air mover initiating the mode for serial digital communication, the air mover communicates an interrupt via the second wire to the processing component in accordance with the digital communication protocol.

5. The information handling system of claim 4, wherein in response to the interrupt, the processing component communicates a command via the first wire to the air mover in accordance with the digital communication protocol to determine why the air mover issued the interrupt.

6. The information handling system of claim 5, wherein, in response to receipt of the command, the air mover communicates a response via the second wire to the processing component in accordance with the digital communication protocol, the response including information regarding why the air mover issued the interrupt.

7. An information handling system comprising:
an air mover configured to drive a flow of air; and
a processing component communicatively coupled to the air mover for controlling operation of the air mover via:
 a first wire configured to communicate analog air mover speed commands from the processing component to the air mover for controlling a speed of the air mover; and
 a second wire configured to communicate analog tachometer information from the air mover to the processing component, wherein the analog tachometer information comprises a series of pulses indicating the speed of the air mover as a function of a frequency of the series of pulses; and
wherein the air mover is configured to initiate a mode for serial digital communication by communicating a pulsed signal via the second wire at a frequency significantly different than the frequency of the series of pulses; and
wherein the air mover and the processing component are configured to communicate information to each other in accordance with a digital communication protocol via the first wire and the second wire during the mode for serial digital communication.

8. The information handling system of claim 7, wherein:
the processing component is configured to initiate the mode for serial digital communication by communicating an initiation signal via the first wire; and
in response to the processing component initiating the mode for serial digital communication, the processing component communicates a command via the first wire to the air mover in accordance with the digital communication protocol.

9. The information handling system of claim 8, wherein, in response to receipt of the command, the air mover communicates a response via the second wire to the processing component in accordance with the digital communication protocol.

10. The information handling system of claim 7, wherein in response to the air mover initiating the mode for serial digital communication, the air mover communicates an interrupt via the second wire to the processing component in accordance with the digital communication protocol.

11. The information handling system of claim 10, wherein in response to the interrupt, the processing component communicates a command via the first wire to the air mover in accordance with the digital communication protocol to determine why the air mover issued the interrupt.

12. The information handling system of claim 11, wherein, in response to receipt of the command, the air mover communicates a response via the second wire to the processing component in accordance with the digital communication protocol, the response including information regarding why the air mover issued the interrupt.

13. A method comprising, in an information handling system including an air mover configured to drive a flow of air and a processing component communicatively coupled to the air mover for controlling operation of the air mover via a first wire configured to communicate analog air mover speed commands from the processing component to the air mover for controlling a speed of the air mover and via a second wire configured to communicate analog tachometer information from the air mover to the processing component, wherein the analog air mover speed commands comprise an analog pulse-width modulated signal such that the speed of the air mover is set as a function of a duty cycle of the analog pulse-width modulated signal:
 initiating, by the processing component, a mode for serial digital communication by communicating a pulse-width modulated signal via the first wire at a frequency significantly different than a frequency of the analog pulse-width modulated signal; and
 responsive to initiating the mode for serial digital communication, communicating, by the air mover and the processing component, information to each other in accordance with a digital communication protocol via the first wire and the second wire during the mode for serial digital communication.

14. The method of claim 13, further comprising in response to the processing component initiating the mode for serial digital communication, communicating by the processing component a command via the first wire to the air mover in accordance with the digital communication protocol.

15. The method of claim 14, further comprising, in response to receipt of the command, communicating by the air mover a response via the second wire to the processing component in accordance with the digital communication protocol.

16. The method of claim 13, further comprising:
the air mover initiating the mode for serial digital communication by communicating an initiation signal via the second wire; and
in response to the air mover initiating the mode for serial digital communication, communicating by the air mover an interrupt via the second wire to the processing component in accordance with the digital communication protocol.

17. The method of claim 16, further comprising, in response to the interrupt, communicating a command via the first wire to the air mover in accordance with the digital communication protocol to determine why the air mover issued the interrupt.

18. The method of claim 17, further comprising, in response to receipt of the command, communicating, by the air mover, a response via the second wire to the processing component in accordance with the digital communication protocol, the response including information regarding why the air mover issued the interrupt.

19. A method comprising, in an information handling system including an air mover configured to drive a flow of air and a processing component communicatively coupled to the air mover for controlling operation of the air mover via a first wire configured to communicate analog air mover speed commands from the processing component to the air mover for controlling a speed of the air mover and via a second wire configured to communicate analog tachometer information from the air mover to the processing component, wherein the analog tachometer information comprises a series of pulses indicating the speed of the air mover as a function of a frequency of the series of pulse:

initiating, by the air mover, a mode for serial digital communication by communicating a pulsed signal via the second wire at a frequency significantly different than the frequency of the series of pulses; and     responsive to initiating the mode for serial digital communication, communicating, by the air mover and the processing component, information to each other in accordance with a digital communication protocol via the first wire and the second wire during the mode for serial digital communication.

20. The method of claim 19, further comprising:

the processing component initiating the mode for serial digital communication by communicating an initiation signal via the first wire; and     in response to the processing component initiating the mode for serial digital communication, communicating by the processing component a command via the first wire to the air mover in accordance with the digital communication protocol.

21. The method of claim 20, further comprising, in response to receipt of the command, communicating by the air mover a response via the second wire to the processing component in accordance with the digital communication protocol.

22. The method of claim 19, further comprising in response to the air mover initiating the mode for serial digital communication, communicating by the air mover an interrupt via the second wire to the processing component in accordance with the digital communication protocol.

23. The method of claim 22, further comprising, in response to the interrupt, communicating a command via the first wire to the air mover in accordance with the digital communication protocol to determine why the air mover issued the interrupt.

24. The method of claim 23, further comprising, in response to receipt of the command, communicating, by the air mover, a response via the second wire to the processing component in accordance with the digital communication protocol, the response including information regarding why the air mover issued the interrupt.

\* \* \* \* \*